Nov. 16, 1965    G. AMBILLE    3,217,743
SAFETY VALVE AND DIRECT PASSAGE AUTOMATIC
INTAKE FITTED WITH SAID VALVE
Filed March 11, 1963    2 Sheets-Sheet 1

INVENTOR
GEORGES AMBILLE

BY
*Bacon & Thomas*
ATTORNEYS

United States Patent Office 3,217,743
Patented Nov. 16, 1965

3,217,743
SAFETY VALVE AND DIRECT PASSAGE AUTOMATIC INTAKE FITTED WITH SAID VALVE
Georges Ambille, Aix-en-Provence, France, assignor to Commissariat a l'Energie Atomique, Paris, France
Filed Mar. 11, 1963, Ser. No. 264,329
Claims priority, application France, Mar. 27, 1962, 892,402
9 Claims. (Cl. 137—519.5)

The present invention relates to a safety valve which is intended for the purpose of closing off a chamber when a sudden overpressure occurs in this latter, characterized in that said valve comprises a body in which is formed a housing or cavity with two openings which are coaxial and in oppositely facing relation, said openings communicating respectively with the chamber and with the exterior, and a plurailty of balls each having a diameter which is greater than that of said openings and arranged inside said housing, the shape and dimensions of said housing as well as the diameter of the balls being such that, when an overpressure is present inside the chamber, one of the balls moves into position so as to close off the opening which provides a means of communication between the housing and the exterior, and that when there is no overpressure inside the chamber, a stem can be inserted from the exterior inside said chamber by outwardly displacing the balls in such a manner as to pass through said openings and through said housing.

The invention is also concerned with an automatic direct-passage intake comprising a valve according to the previous paragraph, characterized in that said intake comprises in addition a hollow cylindrical stem, the external diameter of which corresponds to that of the valve openings and the internal diameter of which corresponds to that of the edge of the bottom nozzle of the valve, the admission process being performed by insertion of said stem inside the valve as a result of displacement of the balls, the extremity of the stem being brought to bear on the edge of the bottom nozzle and the fluid-tightness of the complete unit being ensured both during and after the coupling operation by means of a sealing-joint fitted inside the top section of said valve.

The invention also extends to the characteristic features which are described below as well as to the various possible combinations thereof.

A valve and direct-passage intake in accordance with the invention are illustrated by way of non-limitative example in the accompanying drawings, in which.

Figure 1:
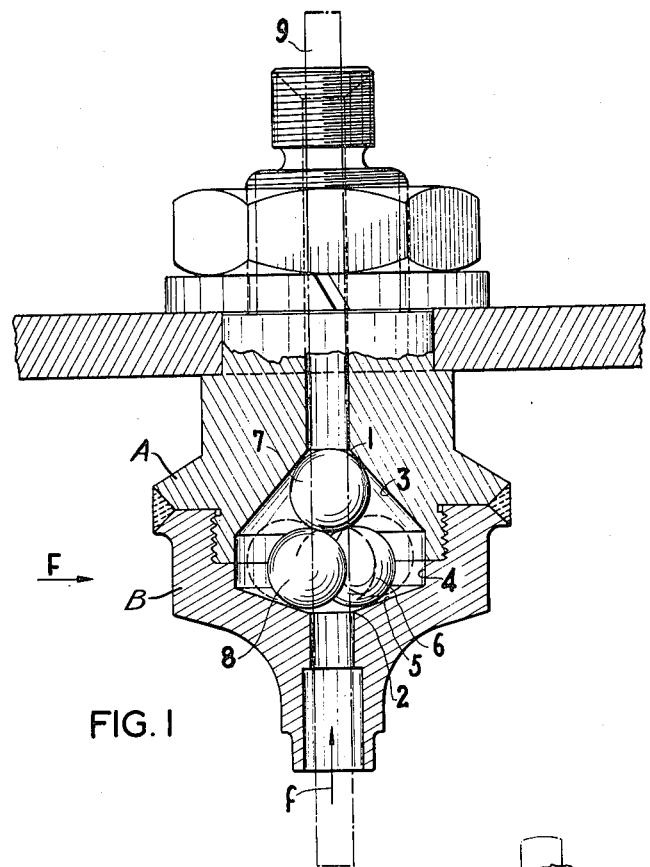
FIG. 1 is a front view taken partly in cross-section of a first form of embodiment of the valve in accordance with the invention.

FIG. 1 represents a three-ball valve in accordance with the invention and constituted by a body A–B in which is formed a housing provided with two co-axial openings, the top opening 1 being designed to communicate with the exterior, the bottom opening 2 being designed to communicate with the interior of the chamber. The housing consists of three sections. The top section 3 is a conical surface which is joined to the opening 1 and to the central section 4 which has a cylindrical shape. The bottom section 5 of the housing is also a conical surface which is joined at the top thereof to the central section 4 and at the bottom thereof to the opening 2.

The walls of the said housing are perfectly smooth. There are located inside this housing three balls which occupy the positions represented in dash lines when there is no overpressure, and which occupy the positions 6, 7, 8 as represented in full lines when an overpressure occurs, and when one of said balls, namely the ball 7 in the figure, accordingly moves into position in such a manner as to shut off the opening 1.

When no overpressure is present, the balls rest in the bottom portion or section of the housing and are applied against each other, thereby leaving the bottom opening 2 completely unobstructed and consequently permitting of free communication between the chamber and the exterior.

Figure 2:
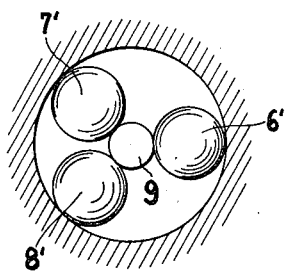
FIG. 2 is a transverse cross-section taken in the direction of the arrow F, of the valve of FIG. 1.

Again in the case of absence of overpressure, it is possibe to cause a stem 9 to move downwards inside the valve through the opening 1, the said stem being designed to displace outwardly the balls 6, 7, 8 which then take up the positions 6', 7', 8' which are shown in FIG. 2. In these positions, there is provided between the central cylindrical wall 4 and the balls a small clearance which is nevertheless sufficient to prevent jamming, thereby determining the diameter of the central cylindrical section 4 of the housing.

The angle of slope of the top conical section 3 of the housing must be such that the ball 7 which is intended to shut off the opening 1 should perferably bear on the surface of said conical section and not on the edge of the opening.

The angle of slope of the bottom conical section 5 must be such that the balls have a tendency to move towards each other while nevertheless permitting the stem 9 to separate them without any danger of jamming.

The height of the central cylindrical wall 4 as well as the angle of slope of the top portion 3 of the housing must be such as to permit one ball to reach the shutting-off position 7 while at the same time forming a minimum clearance between the balls so as to permit the overpressure to lift the balls with a force which is sufficient to produce the shutting-off of the opening 1.

Finally, the volume of of the housing must be sufficiently small to ensure that, at the time of shutting off of the opening 1, one of the two other balls should not also shut off the bottom opening 2, since such a ball would possibly not be displaced from this position by the two other balls as and when the overpressure no longer prevails.

The sizes of the two openings are naturally such that no ball is liable to penetrate inside said openings.

A device of this type in which the dimensions and shapes of the housing and the diameter of the balls satisfy the conditions hereinabove set forth is also capable of operating if the common axis of the openings is not vertical.

Figure 3:
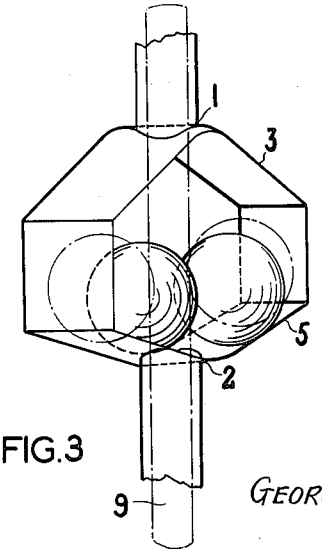
FIG. 3 is a view taken in diagrammatic perspective of a second form of embodiment of the valve in accordance with the invention and FIG. 4 is a front view taken partly in cross-section of a rapid intake with direct passageway as provided with a valve in accordance with the invention.

A second form of embodiment of a valve in accordance with the invention, but with two balls instead of three, is represented in FIG. 3, which is a diagrammatic perspective drawing of the housing, openings and balls.

It can be seen that the housing has the shape of a prismatic box of which the top portion is formed by two inclined planes joined together at the level of the opening 1, the junction radius being longer than the radius of one of the balls, the width of the box being slightly greater than the diameter of the balls.

The angles at which the planes of the bottom and top sections of the housing are inclined as well as the height of the parallelepiped which forms the central section 4 must satisfy the same conditions as those of the device with three balls. In particular, the distance between the transverse faces of section 4 of the housing which are parallel to the common axis of the openings must be slightly greater than the sum of the thickness of the stem and twice the diameter of one of the balls.

Figure 4:
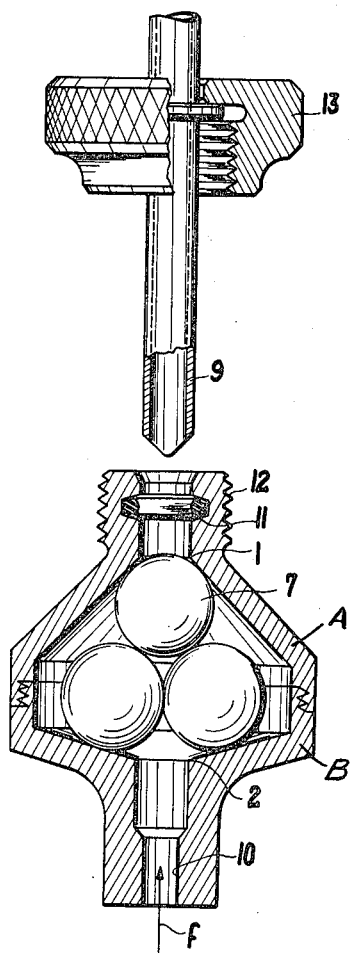

Finally, FIG. 4 represents, with a few detail modifications, the application of a valve in accordance with the invention in a rapid automatic intake with direct passageway, in which no provision is made either for a gate-valve or cock.

The stem 9 is hollow and the external diameter thereof corresponds to the common diameter of the openings 1 and 2, while the internal diameter thereof is equal to that of the passage 10 in order to prevent any pressure-drop. In order to prevent any leakage at the moment of insertion of the stem 9, a sealing joint 11 is accordingly fitted in position above the opening 1.

At the time of insertion inside the valve housing in which the balls are located, the hollow stem thrusts back the ball which is located in position 7 as a result of the pressure of fluid which is applied in the direction of the arrow $f$. The ball 7 thrusts back the two other balls, thereby displacing these latter outwardly and, by reason of the shape given to the extremity of the stem, the said ball 7 is in turn moved away from the common axis of the openings and takes up a position such as position 7' in FIG. 2, while the two other balls take up positions 8' and 6'. The stem 9 accordingly provides a free communication with the bottom passage 10. Thereupon the knurled nut 13 which effects the tightening of the tube is screwed down over the threaded portion 12 of the top section of the valve, whilst the sealing joint 11 continues to ensure the fluid-tightness of the combined unit during use, after completion of the coupling operation.

What I claim is:

1. A valve for closing off a passage leading from a pressure chamber to the exterior upon the occurrence of a sudden overpressure in the chamber, comprising: a body in which is formed a housing, said body having an inlet and an outlet passage formed therein in facing relation, said inlet passage being connectable to the pressure chamber, said outlet passage communicating with the exterior; a plurality of balls loosely arranged in said body, each having a diameter larger than said inlet and said outlet openings, said housing being of sufficient lateral dimension to permit said balls to normally assume positions out of alignment with said passages permitting substantially unobstructed, free passage of fluid through said body, one of said balls being movable from its normal position by a sudden fluid overpressure flowing from said inlet passage through said housing and said outlet passage to a position covering and closing off the inlet end of said outlet passage, said one ball moving by gravity away from said outlet passage to its normal position to permit the flow of fluid therethrough upon a diminishing of said overpressure.

2. A valve in accordance with claim 1 characterized in that the housing contains three balls of the same diameter.

3. A valve in accordance with claim 1, characterized in that the housing is in the form of a prism including a top section and a bottom section, the said sections being each formed by two inclined planes joined together at the level of said outlet and said inlet openings respectively, the junction of the top section having a radius which is longer than that of said one ball.

4. A valve in accordance with claim 3, characterized in that the housing contains two balls each having the same diameter.

5. A valve in accordance with claim 1 in which the walls of said housing include a central cylindrical section forming said lateral dimension: a conical section sloping upwardly and inwardly from the upper edge of said central section; and a conical section sloping downwardly and inwardly from the lower edge of said central section, said inlet and outlet passages being arranged concentrically with the apex of the lower and upper conical wall sections respectively.

6. A valve in accordance with claim 5 in which said inlet and said outlet passages are vertically disposed and in axial alignment.

7. A valve in accordance with claim 5 in which the dimension of said housing normal to said lateral dimension is less than the diameter of any two of said plurality of balls, whereby, when said one ball is moved to said position covering and closing off said inlet end of said outlet passage, the others of said plurality of balls will gravitate toward said inlet passage and said one ball will be in contact with and partially supported by at least one of said others of said plurality of balls.

8. A valve in accordance with claim 1 in which the lateral dimension of said housing is slightly greater than twice the diameter of one of said balls plus the diameter of said outlet passage, whereby a hollow stem for conducting fluid therethrough and having an outer diameter of substantially the same dimension as the diameter of said outlet passage when inserted in sliding engagement through said outlet passage and between said balls prevents said one of said balls from moving to said position covering and closing off said outlet passage.

9. A valve in accordance with claim 1 including a hollow stem removably mounted in said outlet passage and in sealing engagement therewith for conducting fluid therethrough, the inner end of said stem extending into said housing and between said balls, whereby said one ball is prevented from moving to said position covering and closing said outlet passage when said hollow stem is mounted in said outlet passage.

References Cited by the Examiner
UNITED STATES PATENTS

| 884,275 | 4/1908 | Haywood | 251—149.1 |
|---|---|---|---|
| 1,034,995 | 8/1912 | Cannon. | |
| 1,169,105 | 1/1916 | Allan | 251—149.1 |
| 2,731,186 | 1/1956 | Fox | 137—460 X |
| 2,898,128 | 8/1959 | Shohan | 251—149.1 X |

FOREIGN PATENTS 340,700  1/1931  Great Britain.

M. CARY NELSON, *Primary Examiner.*